United States Patent
Salter et al.

(10) Patent No.: US 9,481,297 B2
(45) Date of Patent: Nov. 1, 2016

(54) ILLUMINATED STEERING ASSEMBLY

(71) Applicant: Ford Global Technologies, LLC, Dearborn, MI (US)

(72) Inventors: Stuart C. Salter, White Lake, MI (US); James J. Surman, Clinton Township, MI (US); Pietro Buttolo, Dearborn Heights, MI (US); Cornel Lewis Gardner, Romulus, MI (US); Annette Lynn Huebner, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/851,700

(22) Filed: Sep. 11, 2015

(65) Prior Publication Data

US 2015/0375677 A1 Dec. 31, 2015

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.
| | |
|---|---|
| *B60Q 1/00* | (2006.01) |
| *B60Q 1/26* | (2006.01) |
| *B60Q 3/02* | (2006.01) |
| *F21V 9/16* | (2006.01) |

(Continued)

(52) U.S. Cl.
CPC .............. *B60Q 3/024* (2013.01); *B60Q 3/008* (2013.01); *B60Q 3/0293* (2013.01); *B62D 1/046* (2013.01); *B62D 1/06* (2013.01); *B62D 15/029* (2013.01); *F21K 9/56* (2013.01); *F21V 9/16* (2013.01); *H05B 37/0218* (2013.01); *H05B 37/0227* (2013.01); *B60Q 1/34* (2013.01); *B60Q 3/042* (2013.01); *F21W 2101/02* (2013.01); *F21Y 2101/02* (2013.01); *Y02B 20/46* (2013.01)

(58) Field of Classification Search
CPC .. B60Q 1/1469; B60Q 1/1476; B60Q 3/008; B60Q 3/024; B60Q 3/0293; B60Q 3/042; F21K 9/56; H05B 37/0218; H05B 37/0227
USPC .................. 362/488, 491, 509–511, 543–545
See application file for complete search history.

(56) References Cited

U.S. PATENT DOCUMENTS

| | | |
|---|---|---|
| 5,709,453 A | 1/1998 | Krent et al. |
| 6,117,362 A | 9/2000 | Yen et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A lighting system for a vehicle steering assembly is provided herein. The lighting system includes a steering wheel having a central hub and a rim connected to the hub through a spoke. A light source is disposed on the rim. A first photoluminescent structure is disposed on the steering wheel and configured to luminesce in response to excitation by at least a portion of the light source. In some embodiments, the light source may implement a thin design, thereby helping to fit the light source into small package spaces of the vehicle where traditional light sources may not be practicable.

20 Claims, 12 Drawing Sheets

(51) Int. Cl.
*F21K 99/00* (2016.01)
*B62D 15/02* (2006.01)
*B60Q 3/00* (2006.01)
*H05B 37/02* (2006.01)
*B62D 1/04* (2006.01)
*B62D 1/06* (2006.01)
*F21W 101/02* (2006.01)
*F21Y 101/02* (2006.01)
*B60Q 1/34* (2006.01)
*B60Q 3/04* (2006.01)

(56) References Cited

U.S. PATENT DOCUMENTS

| | | | |
|---|---|---|---|
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 * | 2/2005 | Ramamurthy | B60Q 1/1469 362/482 |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,161,472 B2 | 1/2007 | Strumolo et al. | |
| 7,213,923 B2 | 5/2007 | Liu et al. | |
| 7,264,366 B2 | 9/2007 | Hulse | |
| 7,264,367 B2 | 9/2007 | Hulse | |
| 7,441,914 B2 | 10/2008 | Palmer et al. | |
| 7,605,693 B2 * | 10/2009 | Kulas | B60K 35/00 340/438 |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,071,988 B2 | 12/2011 | Lee et al. | |
| 8,097,843 B2 | 1/2012 | Agrawal et al. | |
| 8,136,425 B2 * | 3/2012 | Bostick | B60Q 3/024 362/487 |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,773,012 B2 | 7/2014 | Ryu et al. | |
| 8,846,184 B2 | 9/2014 | Agrawal et al. | |
| 8,952,341 B2 | 2/2015 | Kingsley et al. | |
| 9,057,021 B2 | 6/2015 | Kingsley et al. | |
| 9,065,447 B2 | 6/2015 | Buttolo et al. | |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2007/0032319 A1 | 2/2007 | Tufte | |
| 2007/0285938 A1 | 12/2007 | Palmer et al. | |
| 2009/0219730 A1 | 9/2009 | Syfert et al. | |
| 2009/0251920 A1 | 10/2009 | Kino et al. | |
| 2009/0262515 A1 | 10/2009 | Lee et al. | |
| 2011/0012062 A1 | 1/2011 | Agrawal et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0335994 A1 | 12/2013 | Mulder et al. | |
| 2014/0065442 A1 | 3/2014 | Kingsley et al. | |
| 2014/0103258 A1 | 4/2014 | Agrawal et al. | |
| 2014/0111324 A1 | 4/2014 | Lisseman et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

ILLUMINATED STEERING ASSEMBLY

CROSS-REFERENCE TO RELATED APPLICATIONS

This application is a continuation-in-part of U.S. patent application Ser. No. 14/603,636, filed Jan. 23, 2015, entitled "DOOR ILLUMINATION AND WARNING SYSTEM" which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference as if fully set forth herein.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a lighting system for a vehicle is disclosed. The lighting system includes a light source disposed on a steering wheel. A first photoluminescent structure is disposed on the light source and is configured to luminesce in response to excitation by the light source.

According to another aspect of the present invention, a lighting system is disclosed. The lighting system includes a steering wheel having a central hub and a rim connected to the hub through a spoke. A light source is disposed on the rim. A first luminescent structure is disposed on the steering wheel and configured to luminesce in response to excitation by at least a portion of the light source.

According to yet another aspect of the present invention, a lighting system for a vehicle steering wheel assembly is disclosed. The lighting system includes a light source disposed within a vehicle. A first photoluminescent structure is disposed on a steering wheel. The first photoluminescent structure is configured to luminesce in response to excitation by light output from at least a portion of the light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
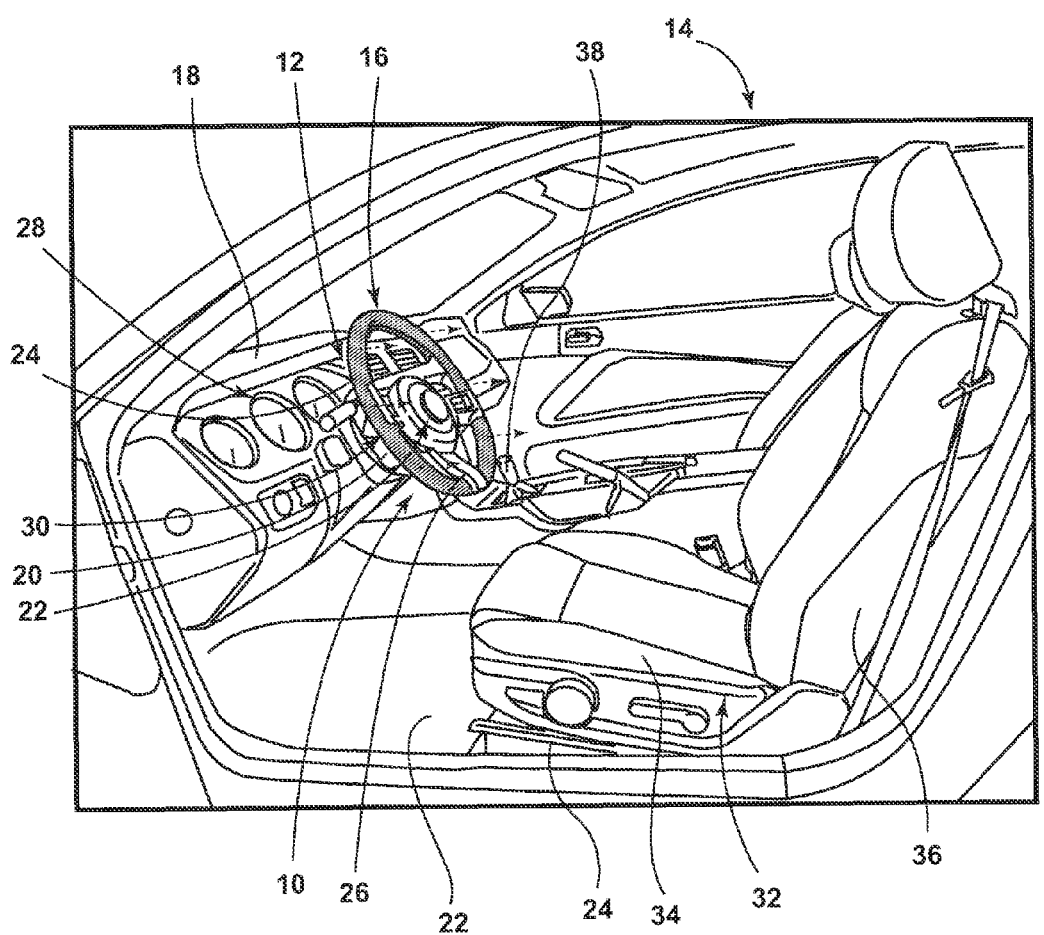
FIG. 1 is a perspective view of a vehicle interior equipped with a lighting system employed on a steering wheel assembly according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system configured to illuminate an area proximately located to a vehicle steering wheel assembly. The lighting system may advantageously employ one or more photoluminescent structures to illuminate in response to pre-defined events. The one or more photoluminescent structures may be configured to convert light received from an associated light source and re-emit the light at a different wavelength typically found in the visible spectrum. In some embodiments, the light source may implement a thin design, thereby helping to fit the light source into small package spaces of the vehicle where traditional light sources may not be practicable.

Referring to FIG. 1, a lighting system 10 is disposed within a steering wheel assembly 12 of a vehicle 14 that is configured to illuminate an area and/or one or more components of the vehicle 14 proximately located to a steering wheel 16, according to one embodiment. The steering wheel assembly 12 is configured to control a steering operation for the vehicle 14. The steering wheel assembly 12 may be mounted to a portion of an instrument panel 18 of a vehicle 14 interior. The steering wheel assembly 12 may include a steering column 20 and a steering wheel 16 connected thereto for rotation in concert with the steering column 20. The steering wheel 16 may include a hub 22 and a rim 24 that is connected to the hub 22 via at least one spoke 26. According to the illustrated embodiment, three spokes 26 are utilized to connect the hub 22 with the rim 24 that are substantially concentrated on the bottom half of the steering wheel 16 to provide adequate viewing of an instrument cluster 28 that is disposed car forward of the steering wheel 16. It is contemplated, however, that any number of spokes 26 may be utilized in any orientation without departing from the concepts of the present disclosure.

When a driver wants to control steering of the road wheels of the vehicle 14, the driver turns the rim 24 of the steering wheel 16. Since the rim 24 is connected to the hub 22 via the spokes 26, rotation of the rim 24 causes rotation of the hub 22 and a shaft 30 connected to the hub 22. The shaft 30 is connected to a steering linkage (not shown), which adjusts an angular position of the vehicle wheels in order to control the steering.

The vehicle 14 may further include a seating assembly 32 that includes a seat 34 pivotally coupled with a seatback 36 and a gear shifter 38 that controls the mode of operation of a vehicle transmission. It should be appreciated that the steering wheel assembly 12 described herein may be utilized for any vehicle 14 such as, but not limited to, coupes, sedans, trucks, sport utility, vans, and the like. Further, it should be appreciated that any lighting system found elsewhere on the vehicle 14 may also be manufactured in accordance with the principles of the present disclosure.

Figure 2:
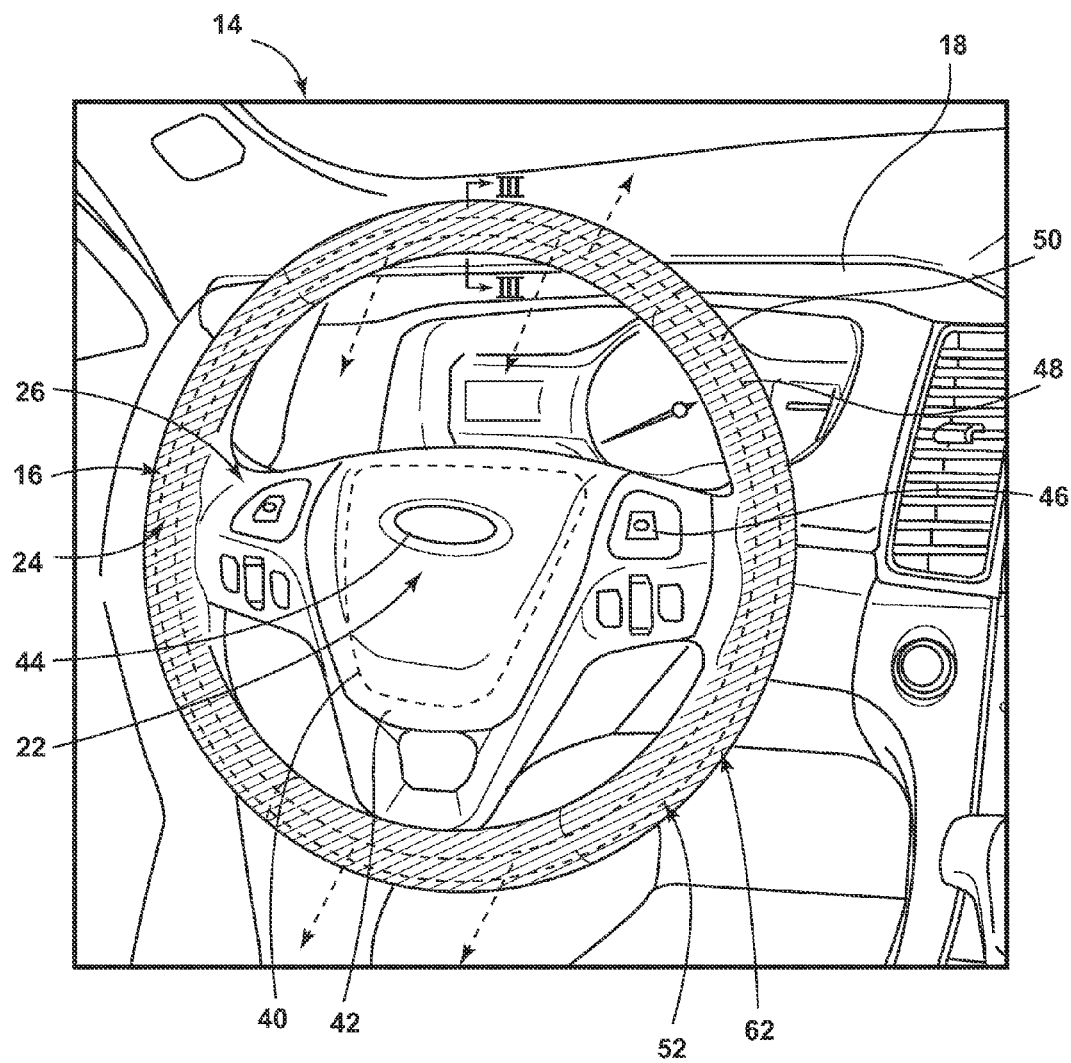
FIG. 2 is a front view of a steering wheel assembly disposed within a vehicle interior employing the lighting system according to one embodiment.

As shown in FIG. 2, the steering wheel 16 includes spokes 26 connecting the hub 22 to the rim 24. The hub 22 may include a support member 40 that may provide structural support of the hub 22 and/or the spokes 26 and rim 24. A trim member 42 may be attached to and disposed car rearward of the support member 40. An airbag (not shown) may be disposed between the support member 40 and trim member 42. The trim member 42 may further include indicia 44 thereon, such as an emblem, logo, or occupant information (e.g., airbag placement). Any component of the hub 22 and/or spokes 26 may include controls 46 thereon for controlling a plurality of vehicle functions. For example, the controls 46 may activate a vehicle's horn. Additionally, or alternatively, the controls 46 may be utilized for controlling a cruise control system. Additional controls 46 may be utilized for operating an audio system, a telephone and voice control system, a navigation system, a stereo system, and on board computer functions, or any other function an occupant may desire.

The rim 24 may be formed from a substrate 48 that has a cover member 50 there over. In the exemplary embodiment, the substrate 48 is a metal or plastic rod that has a circular cross section. In another embodiment, the substrate 48 is a hollow tubular element. In alternate embodiments, the substrate 48 has a rectangular or a polygonal cross-sectional shape. Any suitable material can be used to form the substrate 48, including, but not limited to, steel, aluminum, and magnesium. Also, any suitable polymeric material can be used to form the substrate 48, for example, silicone modified polycarbonates, nylon, polyesters, polyphenylene oxide, polypropylene, and polyurethane.

The cover member 50 may be disposed over the substrate 48 and may be of a pliable or substantially rigid material. According to one embodiment, the cover member 50 is of a flexible material that may comprise thermoplastic elastomer such as thermoplastic olefin or thermoplastic urethane, vinyl, leather, fabric, or other materials suitable for providing a flexible layer over the substrate 48, as known in the art. One or more intermediate components may be disposed between the substrate 48 and cover member 50 that may also be sufficiently flexible to deflect under the application of an external force, such as the pressure applied by the hand of a vehicle occupant, to compress the cover member 50 and/or intermediate components, if desired. For example, the steering wheel assembly 12 may include intermediate components such that the steering wheel 16 may be temperature-controlled for heating and cooling an occupant's hands while steering the vehicle 14, as is known in the art.

In alternate embodiments, the cover member 50 may be manufactured from a substantially rigid material. According to one embodiment, the cover member 50 is configured as a veneer made from a wood material. It should be appreciated that the cover member 50 may be configured from any other practicable material without departing from the concepts of the present disclosure. Furthermore, it should be understood that the cover member 50 may include any additional layers thereon to protect the cover member 50 or to provide a desired aesthetic appearance.

A light source 52 may be disposed on and/or within the steering wheel assembly 12. As illustrated, the light source 52 is disposed on the rim 24 and is oriented to emit light towards an occupant disposed within the vehicle 14. According to one embodiment, the light source 52 includes a flexible circuit board (e.g., a copper flexible circuit) that is coupled to, attached to, or disposed under a portion of the cover member 50. In such an arrangement, the flexible circuit board may flex in conjunction with the curvature of the rim 24 to allow the lighting system 10 to be contoured with the steering wheel 16.

A photoluminescent structure 62 may be applied or otherwise arranged on and/or proximate the light source 52. One or more light sources 52 may be disposed within the lighting system 10 and configured to emit light towards a target location. More specifically, light emitted from the light source 52 towards the target location may be converted by the photoluminescent structure 62 and re-emitted as light having a different wavelength, typically in the visible spectrum. According to the illustrated embodiment, the target location is an area disposed proximate to the steering wheel 16. It is contemplated that the lighting system 10 may have a wide range of target locations such that the lighting system 10 may be used for a plurality of functions. Exemplary functions include usage as a welcome/farewell lamp, a warning indicator, ambient lighting, and/or a lamp that provides information about features 148 (FIG. 6) of the vehicle 14 to occupants thereof.

The light source 52 may be over molded, or otherwise attached, to a portion of the steering wheel 16, such as the rim 24. According to the embodiment illustrated in FIG. 2, the rim 24 and the light source 52 are placed in a mold simultaneously and an overmold material 66 is disposed over the combination of the rim 24 and the light source 52. In embodiments where the overmold material 66 is cured under pressure, the overmold material 66 may be applied to the rim 24 in a partly-cured condition. In one embodiment the over molding process includes applying the overmold material 66 onto at least a part of the combination of the rim 24 and light source 52 by spraying, brushing, dipping, printing, laminating or rolling, followed by curing the overmold material 66. Such a process results in the rim 24 and light source 52 being coupled to one another. In some embodiments, the overmold material 66 may include a polymeric material, silicon, urethane material, vinyl, and/or any other material that may be advantageous or structurally sound for placement within a zone that regularly comes in contact with occupants of the vehicle 14. Moreover, in some embodiments, the overmold material 66 may be transparent or translucent and may provide light diffusing characteristics. It is also contemplated that in some embodiments, the cover member 50 and overmold material 66 may be the same component, or integrally formed with one another.

Figure 3A:
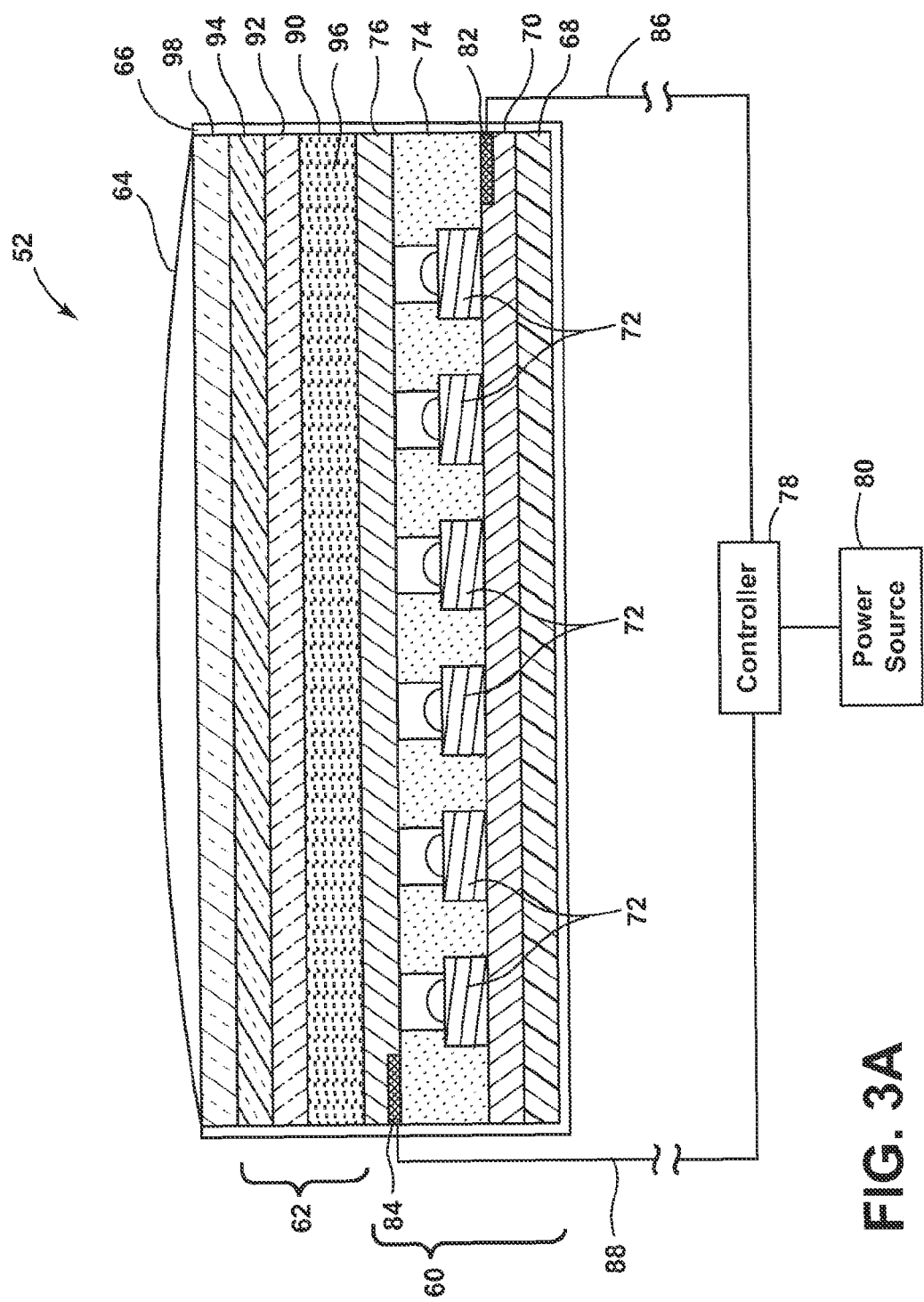
FIG. 3A is a cross-sectional view taken along line III-III of FIG. 2 illustrating a light source according to one embodiment.

Referring to FIGS. 3A-3E, a cross-sectional view of the light source 52 capable of use on a vehicle 14 with an external photoluminescent structure 62 is shown according to one embodiment. As illustrated in FIG. 3A, the light source 52 may have a stacked arrangement that includes a light-producing assembly 60, a photoluminescent structure 62, a viewable portion 64, and an overmold material 66. It should be appreciated that the viewable portion 64 and the overmold material 66 may be two separate components, or may be integrally formed as a single component.

The light-producing assembly 60 may correspond to a thin-film or printed light emitting diode (LED) assembly and includes a base member 68 as its lowermost layer. The base member 68 may include a polycarbonate, poly-methyl methacrylate (PMMA), or polyethylene terephthalate (PET) material, or any other material known in the art, on the order of 0.005 to 0.060 inches thick and is arranged over the intended vehicle 14 surface on which the light source 52 is to be received (e.g., rim 24). Alternatively, as a cost saving measure, the base member 68 may directly correspond to a preexisting vehicle structure (e.g., rim 24, exterior panels, and/or interior panels).

The light-producing assembly 60 includes a positive electrode 70 arranged over the base member 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 70 may be arranged over the aforementioned semiconductor ink 74. Likewise, additional components, such as the bus bars 82, 84 may also be placed in any orientation such that the light-producing assembly 60 may emit inputted light 100 (FIG. 3B) towards a desired location.

The LED sources 72 may be dispersed in a random or controlled fashion within the semiconductor ink 74 and may be configured to emit focused or non-focused light toward the photoluminescent structure 62. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 3A, the photoluminescent structure 62 is arranged over the negative electrode 76 as a coating, layer, film or other suitable deposition. With respect to the presently illustrated embodiment, the photoluminescent structure 62 may be arranged as a multi-layered structure including an energy conversion layer 90, optional stability layer 92, and optional protection layer 94.

The energy conversion layer 90 includes at least one photoluminescent material 96 having energy converting elements with phosphorescent or fluorescent properties. For example, the photoluminescent material 96 may include organic or inorganic fluorescent dyes including rylenes, xanthenes, porphyrins, phthalocyanines. Additionally, or alternatively, the photoluminescent material 96 may include phosphors from the group of Ce-doped garnets such as YAG:Ce. The energy conversion layer 90 may be prepared by dispersing the photoluminescent material 96 in a polymer matrix to form a homogenous mixture using a variety of methods. Such methods may include preparing the energy conversion layer 90 from a formulation in a liquid carrier medium and coating the energy conversion layer 90 to the negative electrode 76 or other desired base member 68. The energy conversion layer 90 may be applied to the negative electrode 76 by painting, screen printing, flexography, spraying, slot coating, dip coating, roller coating, bar coating, and/or any other methods known in the art. Alternatively, the energy conversion layer 90 may be prepared by methods that do not use a liquid carrier medium. For example, the energy conversion layer 90 may be rendered by dispersing the photoluminescent material 96 into a solid state solution (homogenous mixture in a dry state) that may be incorporated in a polymer matrix formed by extrusion, injection seal, compression seal, calendaring, thermoforming, etc.

To protect the photoluminescent material 96 contained within the energy conversion layer 90 from photolytic and thermal degradation, the photoluminescent structure 62 may include the stability layer 92. The stability layer 92 may be configured as a separate layer optically coupled and adhered to the energy conversion layer 90 or otherwise integrated therewith. The photoluminescent structure 62 may also include the protection layer 94 optically coupled and adhered to the stability layer 92 or other layer (e.g., the energy conversion layer 90 in the absence of the stability layer 92) to protect the photoluminescent structure 62 from physical and chemical damage arising from environmental exposure. The stability layer 92 and/or the protection layer 94 may be combined with the energy conversion layer 90 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent material 96 is formulated to become excited upon receiving inputted light 100 (FIG. 3B) of a specific wavelength from at least a portion of the LED sources 72 of the light-producing assembly 60. As a result, the inputted light 100 undergoes an energy conversion process and is re-emitted at a different wavelength. According to one embodiment, the photoluminescent material 96 may be formulated to convert inputted light 100 into a longer wavelength light, otherwise known as down conversion. Alternatively, the photoluminescent material 96 may be formulated to convert inputted light 100 into a shorter wavelength light, otherwise known as up conversion. Under either approach, light converted by the photoluminescent material 96 may be immediately outputted 102 (FIG. 3B) from the photoluminescent structure 62 or otherwise used in an energy cascade, wherein the converted light serves as inputted light to excite another formulation of photoluminescent material 96 located within the energy conversion layer 90, whereby the subsequent converted light may then be outputted from the photoluminescent structure 62 or used as inputted light, and so on. With respect to the energy conversion processes described herein, the difference in wavelength between the inputted light 100 and the converted outputted light 102 is known as the Stokes shift and serves as the principle driving mechanism for an energy conversion process corresponding to a change in wavelength of light.

With continued reference to FIG. 3A, the viewable portion 64 is arranged over the photoluminescent structure 62. In some embodiments, the viewable portion 64 may include a plastic, silicon, or urethane material and is molded over the photoluminescent structure 62 and light-producing assembly 60. Preferably, the viewable portion 64 should be at least partially light transmissible. In this manner, the viewable portion 64 will be illuminated by the photoluminescent structure 62 whenever an energy conversion process is underway. Additionally, by over-sealing the viewable portion 64, it may also function to protect the photoluminescent structure 62 and the light-producing assembly 60. The viewable portion 64 may be arranged in a planar shape and/or an arcuate shape to enhance its viewing potential when in a luminescent state. Like the photoluminescent structure 62 and the light-producing assembly 60, the viewable portion 64 may also benefit from a thin design, thereby helping to fit the light source 52 into small package spaces of the vehicle 14.

In some embodiments, a decorative layer 98 may be disposed between the viewable portion 64 and the photoluminescent structure 62. The decorative layer 98 may include a polymeric material or other suitable material and is configured to control or modify an appearance of the viewable portion 64 of the light source 52. For example, the decorative layer 98 may be configured to confer a leather appearance to the viewable portion 64 when the viewable portion 64 is in an unilluminated state. In other embodiments, the decorative layer 98 may be tinted any color to complement the vehicle structure on which the light source 52 is to be received. For example, the decorative layer 98 may be similar in color to that of the rim 24 so that the lighting system 10 is substantially hidden when in the unilluminated state. Alternatively, the decorative layer 98 may provide indicia 44 and/or an emblem such that the decorative layer 98 and the indicia 44 may be backlit and/or otherwise illuminated by the light-producing assembly 60. In any event, the decorative layer 98 should be at least partially light transmissible such that the photoluminescent structure 62 is not prevented from illuminating the viewable portion 64 whenever an energy conversion process is underway.

The overmold material 66 is disposed around the light-producing assembly 60 and photoluminescent structure 62 and may be formed integrally with the viewable portion 64. The overmold material 66 may protect the light-producing assembly 60 from a physical and chemical damage arising from environmental exposure. The overmold material 66 may have viscoelasticity (i.e., having both viscosity and elasticity), a low Young's modulus, and/or a high failure strain compared with other materials so that the overmold material 66 may protect the light-producing assembly 60 when contact is made thereto. For example, the overmold material 66 may protect the light-producing assembly 60 from the repetitive contact that may occur when the occupants utilize the steering wheel assembly 12 employing the lighting system 10 described herein.

In some embodiments, the photoluminescent structure 62 may be employed separate and away from the light-producing assembly 60. For example, the photoluminescent structure 62 may be positioned on a vehicle component or surface proximate, but not in physical contact, with the light-producing assembly 60, as will be described in more detail below. It should be understood that in embodiments where the photoluminescent structure 62 is incorporated into distinct components separated from the light source 52, the light source 52 may still have the same or similar structure to the light source 52 described in reference to FIG. 3A.

Figure 3B:
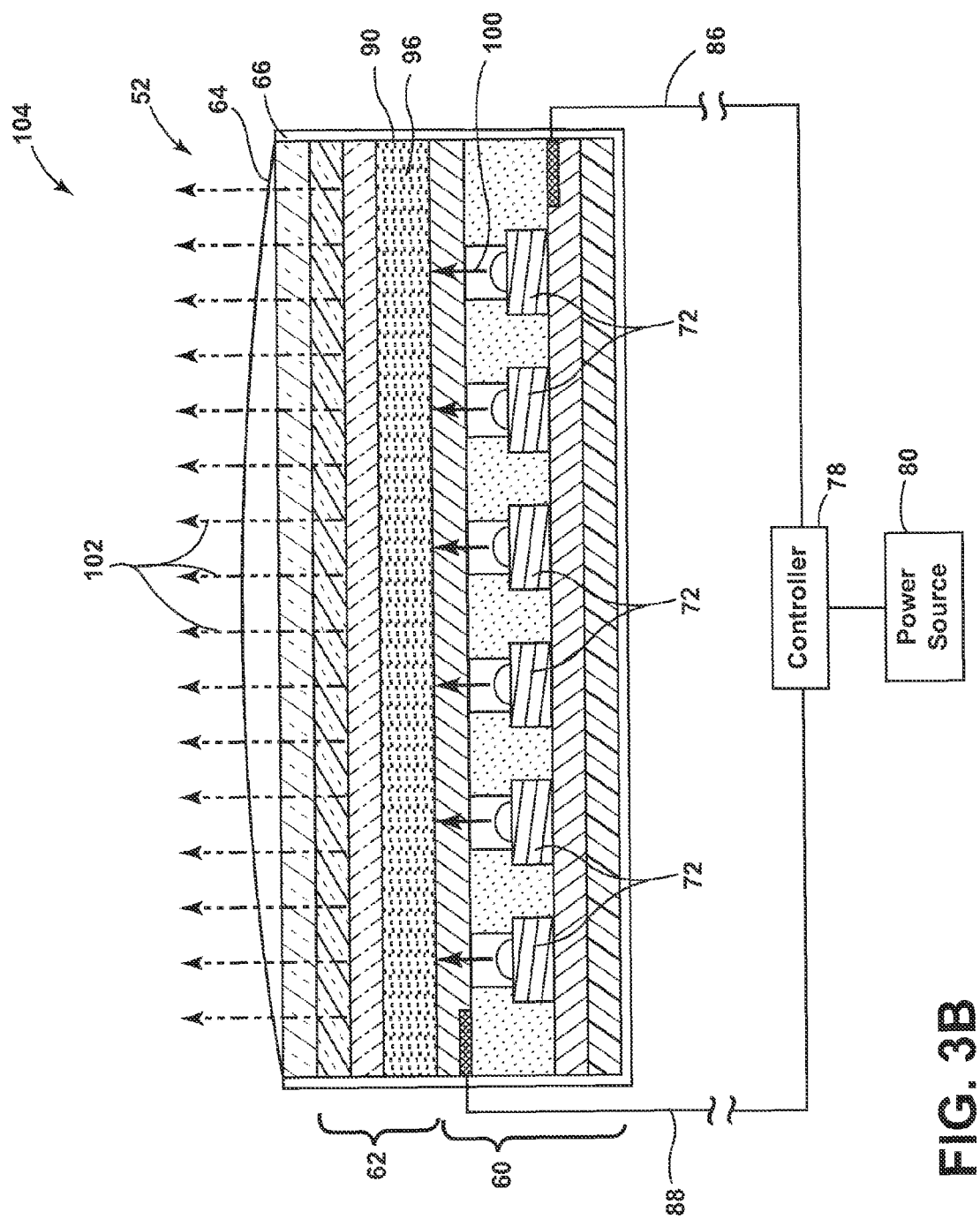
FIG. 3B is a cross-sectional view taken along line III-III of FIG. 2 further illustrating the light source, according to one embodiment.

Referring to FIG. 3B, an energy conversion process 104 for producing single color luminescence is illustrated according to one embodiment. For purposes of illustration, the energy conversion process 104 is described below using the light source 52 depicted in FIG. 3A. In this embodiment, the energy conversion layer 90 of the photoluminescent structure 62 includes a single photoluminescent material 96, which is configured to convert inputted light 100 received from LED sources 72 into an outputted light 102 having a wavelength different than that associated with the inputted light 100. More specifically, the photoluminescent material 96 is formulated to have an absorption spectrum that includes the emission wavelength of the inputted light 100 supplied from the LED sources 72. The photoluminescent material 96 is also formulated to have a Stokes shift resulting in the converted visible outputted light 102 having an emission spectrum expressed in a desired color, which may vary per lighting application. The converted visible outputted light 102 is outputted from the light source 52 via the viewable portion 64, thereby causing the viewable portion 64 to illuminate in the desired color. In one embodiment, the energy conversion process 104 is undertaken by way of down conversion, whereby the inputted light 100 includes light on the lower end of the visibility spectrum such as blue, violet, or ultraviolet (UV) light. Doing so enables blue, violet, or UV LEDs to be used as the LED sources 72, which may offer a relative cost advantage over simply using LEDs of the desired color and foregoing the energy conversion, process altogether. Furthermore, the illumination provided by the viewable portion 64 may offer a unique, substantially uniform, and/or attractive viewing experience that may be difficult to duplicate through non-photoluminescent means.

Figure 3C:
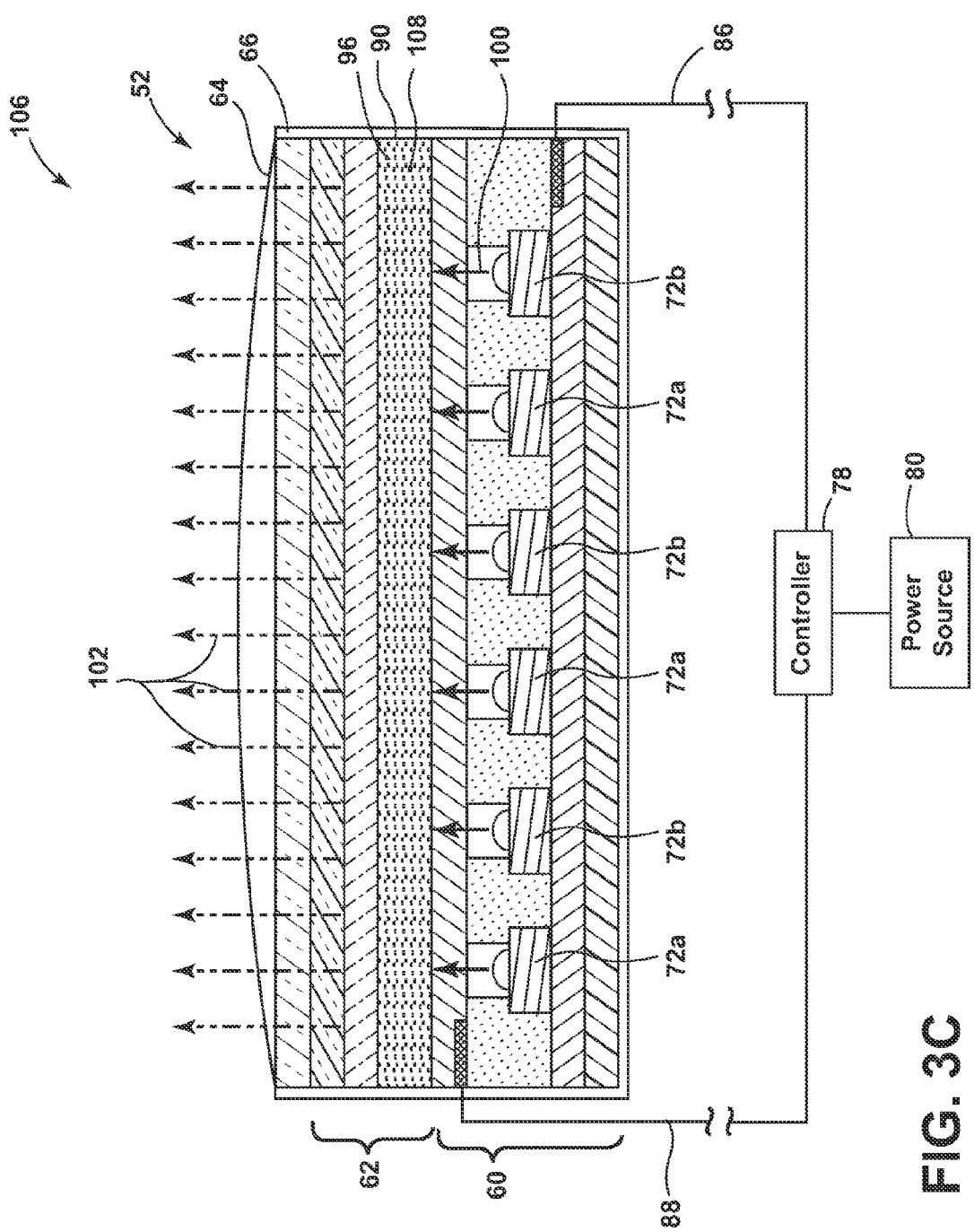
FIG. 3C is a cross-sectional view taken along line III-III of FIG. 2 illustrating an alternate light source, according to one embodiment.

Referring to FIG. 3C, a second energy conversion process 106 for generating multiple colors of light is illustrated according to one embodiment. For consistency, the second energy conversion process 106 is also described below using the light source 52 depicted in FIG. 3A. In this embodiment, the energy conversion layer 90 includes the first and second photoluminescent materials 96, 108 that are interspersed within the energy conversion layer 90. Alternatively, the photoluminescent materials 96, 108 may be isolated from each other if desired. Also, it should be appreciated that the energy conversion layer 90 may include more than two different photoluminescent materials 96, 108, in which case, the concepts provided herein similarly apply. In one embodiment, the second energy conversion process 106 occurs by way of down conversion using blue, violet, and/or UV light as the source of excitation.

With respect to the presently illustrated embodiment, the excitation of photoluminescent materials 96, 108 is mutually exclusive. That is, photoluminescent materials 96, 108 are formulated to have non-overlapping absorption spectrums and Stoke shifts that yield different emission spectrums. Also, in formulating the photoluminescent materials 96, 108, care should be taken in choosing the associated Stoke shifts such that the converted outputted light 102 emitted from one of the photoluminescent materials 96, 108, does not excite the other, unless so desired. According to one exemplary embodiment, a first portion of the LED sources 72, exemplarily shown as LED sources 72a, is configured to emit an inputted light 100 having an emission wavelength that only excites photoluminescent material 96 and results in the inputted light 100 being converted into a visible light outputted 102 of a first color (e.g., white). Likewise, a second portion of the LED sources 72, exemplarily shown as LED sources 72b, is configured to emit an inputted light 100 having an emission wavelength that only excites second photoluminescent material 108 and results in the inputted light 100 being converted into a visible outputted light 102 of a second color (e.g., red). Preferably, the first and second colors are visually distinguishable from one another. In this manner, LED sources 72a and 72b may be selectively activated using the controller 78 to cause the photoluminescent structure 62 to luminesce in a variety of colors. For example, the controller 78 may activate only LED sources 72a to exclusively excite photoluminescent material 96, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 96, 108 to become excited, resulting in the viewable portion 64 illuminating in a third color, which is a color mixture of the first and second color (e.g., pinkish). The intensities of the inputted light 100 emitted from each light source 72a, 72d may also be proportionally varied to one another such that additional colors may be obtained. For energy conversion layers 90 containing more than two distinct photoluminescent materials 96, 108, a greater diversity of colors may be achieved. Contemplated colors include red, green, blue, and combinations thereof, including white, all of which may be achieved by selecting the appropriate photoluminescent materials and correctly manipulating their corresponding LED sources 72.

Figure 3D:
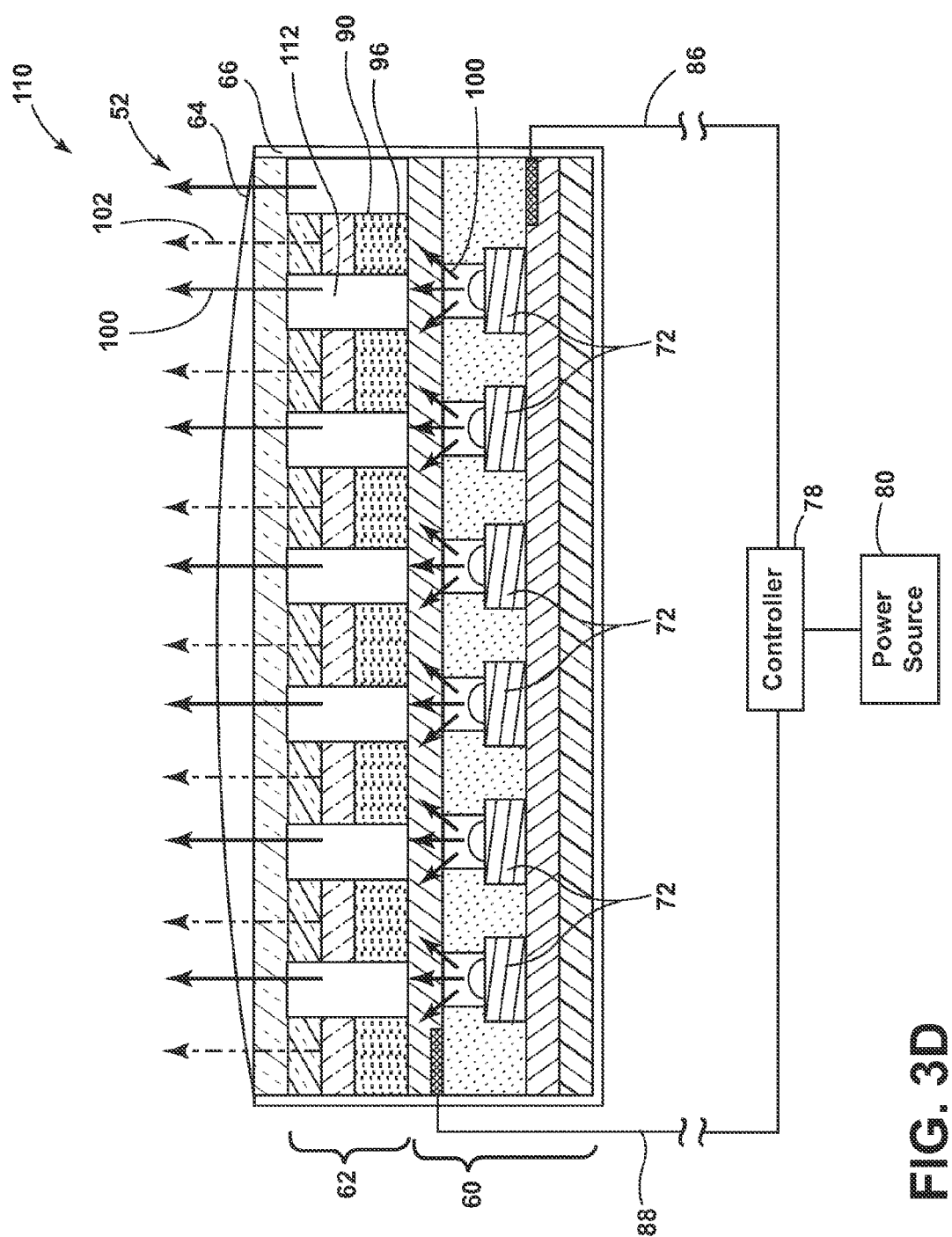
FIG. 3D is a cross-sectional view taken along line III-III of FIG. 2 illustrating a light source having a luminescent structure separated by light transmissive portions disposed on the light source, according to one embodiment.

Referring to FIG. 3D, a third energy conversion process 110 includes a light-producing assembly 60, such as the one described in reference to FIG. 3A, and a photoluminescent structure 62 disposed thereon is illustrated, according to an alternate embodiment. The photoluminescent structure 62 is configured to convert inputted light 100 received from LED sources 72 into a visible outputted light 102 having a wavelength different than that associated with the inputted light 100. More specifically, the photoluminescent structure 62 is formulated to have an absorption spectrum that includes the emission wavelength of the inputted light 100 supplied from the LED sources 72. The photoluminescent material 96 is also formulated to have a Stokes shift resulting in the converted visible outputted light 102 having an emission spectrum expressed in a desired color, which may vary per lighting application.

The photoluminescent structure 62 may be applied to only a portion of the light-producing assembly 60, for example, in a stripped manner. Between the photoluminescent structures 62 may be light transmissive portions 112 that allow inputted light 100 emitted from the LED sources 72 to pass therethrough at the first wavelength. The light transmissive portions 112 may be an open space, or may be a transparent or translucent material. The inputted light 100 emitted through the light transmissive portions 112 may be directed from the light-producing assembly 60 towards a second photoluminescent structure 132 (FIG. 5) disposed proximate to the light-producing assembly 60. The second photoluminescent structure 132 may be configured to luminesce in response to the inputted light 100 that is directed through the light transmissive portions 112.

Figure 3E:
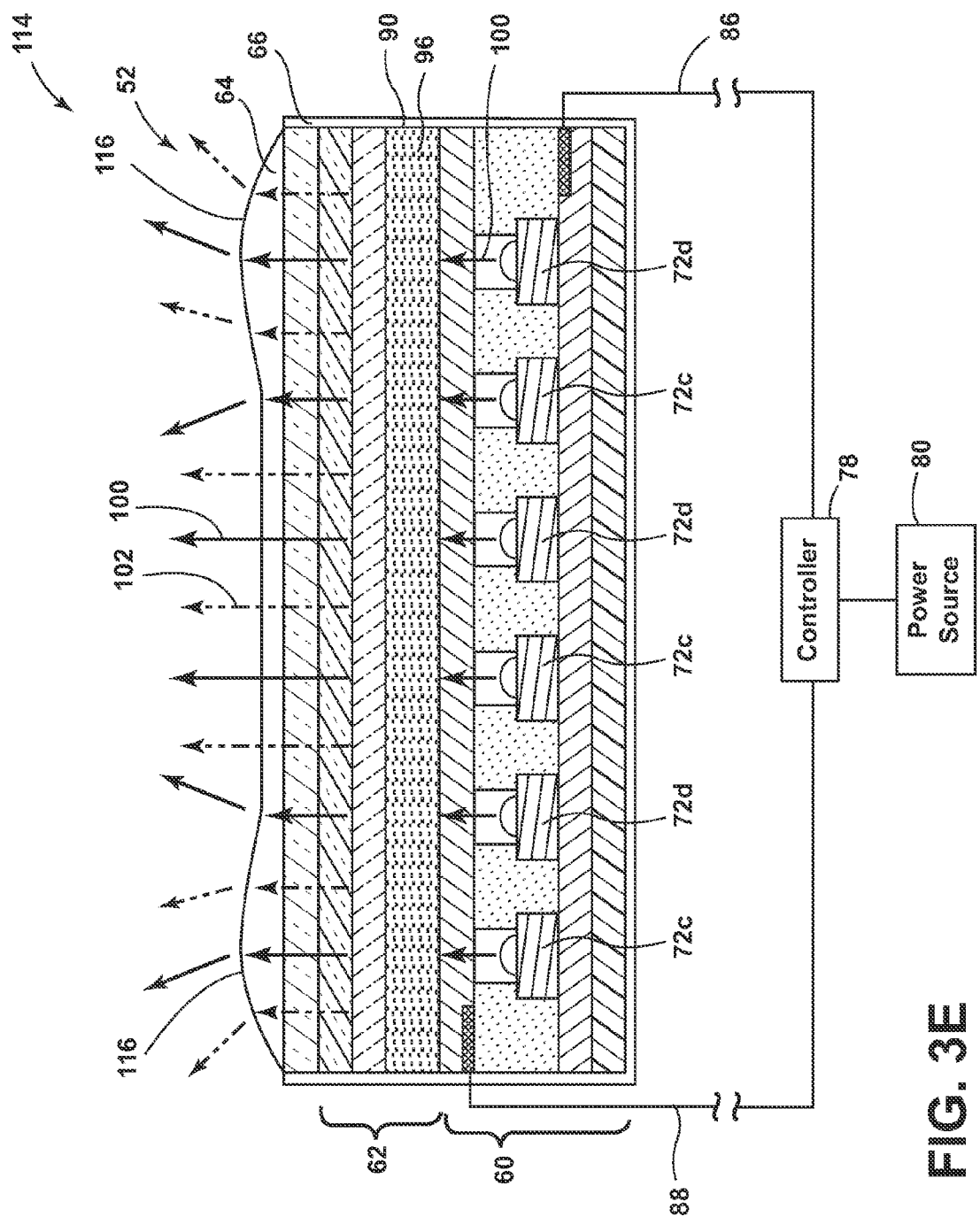
FIG. 3E is a cross-sectional view taken along line III-III of FIG. 2 illustrating an alternate light source having a luminescent structure disposed on the light source configured to convert a portion of light emitted from the light source from a first wavelength to a second wavelength, according to one embodiment.

Referring to FIG. 3E, a fourth energy conversion process 114 for generating multiple colors of light utilizing the light-producing assembly 60, such as the one described in reference to FIG. 3A, and a photoluminescent structure 62 disposed thereon is illustrated. In this embodiment, the photoluminescent structure 62 is disposed over a top portion of the light-producing assembly 60. The excitation of photoluminescent material 96 is formulated such that a portion of inputted light 100 emitted from the LED sources 72 passes through the photoluminescent structure 62 at the first wavelength (i.e., the inputted light 100 emitted from the light source 52 is not converted by the photoluminescent structure 62). The intensity of the emitted inputted light 100 may be modified by pulse-width modulation or current control to vary the amount of inputted light 100 emitted from the LED sources 72 that passes through the photoluminescent structure 62 without converting to a second, outputted 102 wavelength. For example, if the light source 52 is configured to emit inputted light 100 at a low level, substantially all of the inputted light 100 may be converted to the second wavelength of outputted light 102. In this configuration, a color of outputted light 102 corresponding to the photoluminescent structure 62 may be emitted from the light-producing assembly 60. If the light source 52 is configured to emit inputted light 100 at a high level, only a portion of the first wavelength may be converted by the photoluminescent structure 62. In this configuration, a first portion of the inputted light 100 may be converted by the photoluminescent structure 62 and a second portion of the inputted light 100 may be emitted from the light-producing assembly 60 at the first wavelength towards additional photoluminescent structures 132 disposed proximately to the light source 52. The additional photoluminescent structures 132 may luminesce in response to the inputted light 100 emitted from the light source 52.

According to one exemplary embodiment, a first portion of the LED sources 72, exemplarily shown as LED sources 72a is configured to emit an inputted light 100 having a wavelength that excites the photoluminescent material 96 within the photoluminescent structure 62 and results in the inputted light 100 being converted into a visible outputted light 102 of a first color (e.g., white). Likewise, a second portion of the LED sources 72, exemplarily shown as LED sources 72c, is configured to emit an inputted light 100 having a wavelength that passes through the photoluminescent structure 62 and excites additional photoluminescent structures 132 disposed proximately to the lighting system 10 thereby illuminating in a second color. The first and second colors may be visually distinguishable from one another. In this manner, LED sources 72a and 72c may be selectively activated using the controller 78 to cause the lighting system 10 to luminesce in a variety of colors.

The light-producing assembly 60 may also include optics 116 that are configured to direct inputted light 100 emitted from the LED sources 72a, 72c and the outputted light 102 emitted from the photoluminescent structure 62 towards pre-defined locations. For example, the inputted light 100 emitted from the LED sources 72a, 72c and the photoluminescent structure 62 may be directed and/or focused towards a desired feature 148 (FIG. 6) and/or location proximate to the light source 52.

Figure 4:
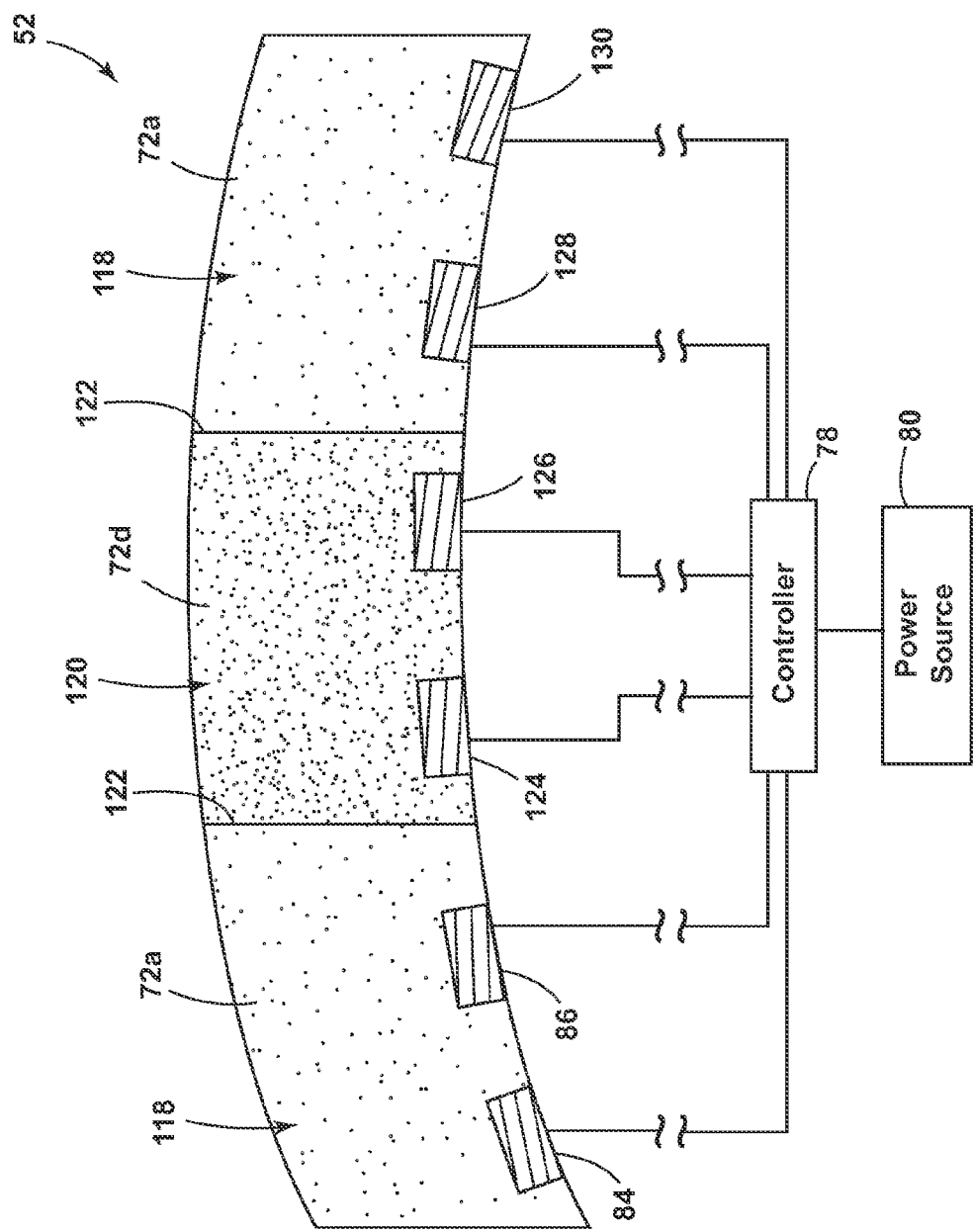
FIG. 4 illustrates a top view of a light-producing assembly, according to one embodiment, having varying types and concentrations of LED sources transversely along the light-producing assembly.

Referring to FIG. 4, a light-producing assembly 60, according to one embodiment, is illustrated from a top view having varying types and concentrations of LED sources 72a, 72d transversely along the light-producing assembly 60. As illustrated, a first portion 118 of the light-producing assembly 60 includes LED sources 72a that are configured to emit an inputted light 100 having an emission wavelength in a first color (e.g., white) spectrum. Likewise, a second portion 120 of the light-producing assembly 60 includes LED sources 72d that are configured to emit an inputted light 100 having an emission wavelength in a second color (e.g., red) spectrum. The first and second portions 118, 120 of the light-producing assembly 60 may be separated by insulative, or non-conductive, barriers 122 from proximately disposed portions through any means known in the art such that each portion 118, 120 may be illuminated independently of any other portion 118, 120. Further, each portion 118, 120 disposed within the light-producing assembly 60 may include a respective bus bar 82, 84, 124, 126, 128, 130 coupled to the controller 78 and configured to illuminate each respective portion 118, 120. It should be appreciated that the bus bars 82, 84, 124, 126, 128, 130 may be coupled to each portion 118, 120 of the light-producing assembly 60 on opposing sides in alternate embodiments, as described above.

According to one embodiment, the first and second colors are visually distinguishable from one another. In this manner, LED sources 72a and 72d may be selectively activated using the controller 78 to cause the LED sources 72a, 72d to illuminate in a variety of colors. For example, the controller 78 may activate only LED sources 72a to exclusively illuminate a portion 118 of the light-producing assembly 60 in the first color. Alternatively, the controller 78 may activate only LED sources 72d to exclusively illuminate a portion 120 of the light-producing assembly 60 in the second color. It should be appreciated that the light-producing assembly 60 may include any number of portions 118, 120 having varying LED sources 72a, 72d that may illuminate in any desired color. Moreover, it should also be appreciated that the portions having varying LED sources 72a, 72d may be orientated in any practicable manner and need not be disposed adjacently.

The semiconductor ink 74 may also contain various concentrations of LED sources 72a, 72d such that the density of the LED sources 72a, 72d, or number of LED sources 72a, 72d per unit area, may be adjusted for various lighting applications. In some embodiments, the density of LED sources 72a, 72d may vary across the length of the light source 52. For example, a central portion 120 of the light-producing assembly 60 may have a greater density of LED sources 72 than peripheral portions 118, or vice versa. In such embodiments, the light source 52 may appear brighter or have a greater luminance in order to preferentially illuminate pre-defined locations. In other embodiments, the density of LED sources 72a, 72d may increase or decrease with increasing distance from a preselected point.

Figure 5A:
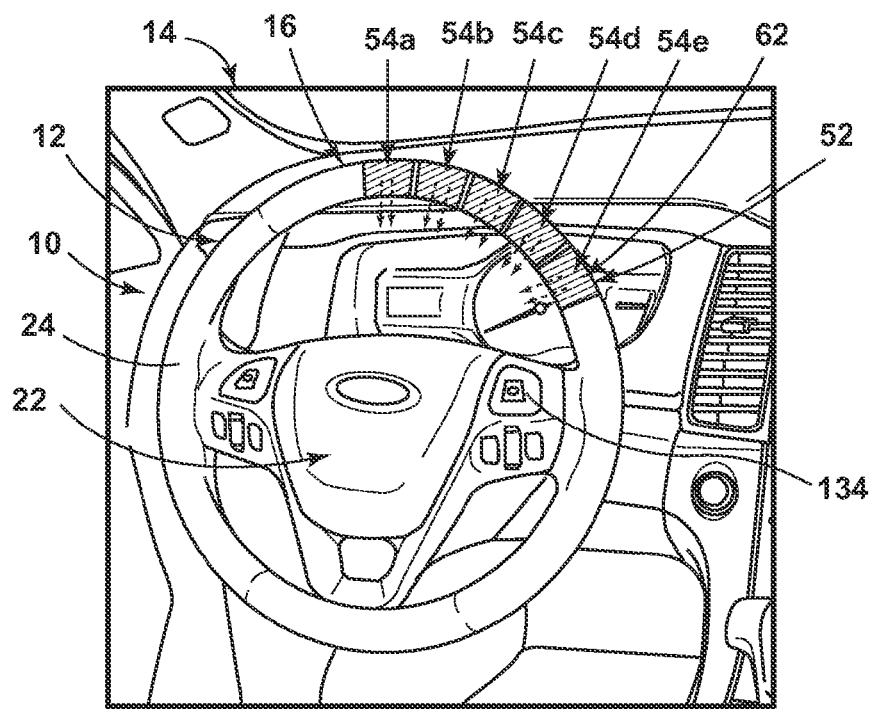
FIG. 5A is a front view of a vehicle steering wheel assembly employing the lighting system, according to one embodiment.
Figure 5B:
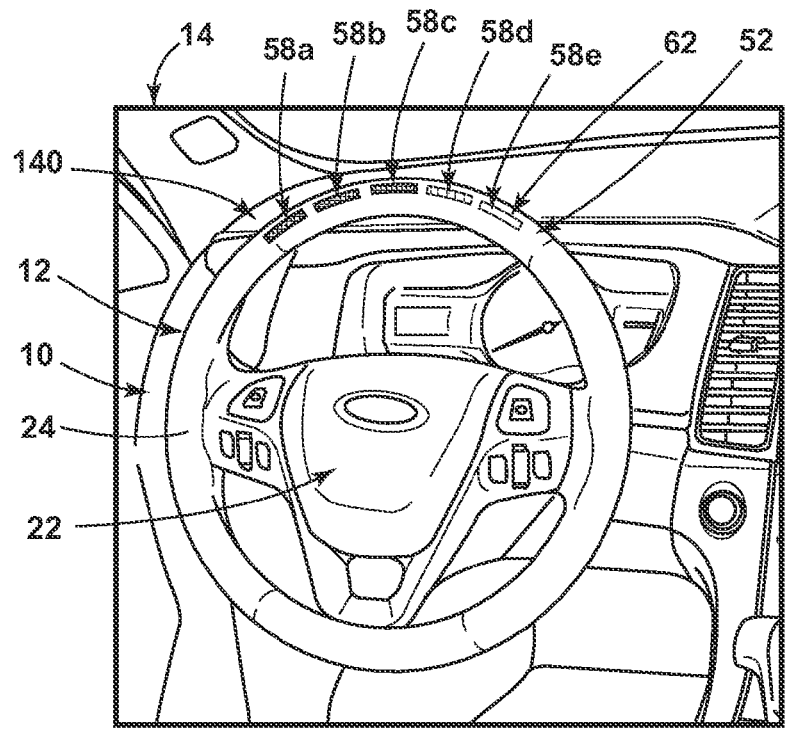
FIG. 5B is a front view of a vehicle steering wheel assembly employing the lighting system, according to one embodiment.

Referring to FIGS. 5A and 5B, the lighting system 10 is configured to attach to the rim 24 of the steering wheel 16, according to one embodiment. As illustrated, the light-producing assembly 60 emits a substantial portion of the inputted light 100 and outputted light 102 in a vehicle 14 reward orientation. However, it is contemplated that the inputted light 100 may be directed in any desired direction within the vehicle 14 depending on the structure and packaging of the steering wheel assembly 12.

A photoluminescent structure 62 is operatively coupled with the light source 52. For example, according to one embodiment, the light source 52 may be disposed under the cover member 50. A photoluminescent structure 62 may be disposed within the cover member 50 material and operatively coupled to the light source 52. As a result, the portion of the cover member 50 containing the photoluminescent structure 62 may be excited by the light source 52 and emit converted, outputted light 102.

The lighting system 10 may further include a user interface 134 disposed proximately to the lighting system 10, or any other desired location within a vehicle 14. The user interface 134 may be configured such that a user may control the wavelength of light that is emitted by the LED sources 72a and/or the LED sources 72d that are illuminated. Alternatively, the user interface 134 may be used to switch the lighting system 10 through a plurality of modes and/or functions. The user interface 134 may use any type of control known in the art for control the light source 52, such as, but not limited to, switches (e.g., proximity sensors, push-type buttons) and may be disposed in any practicable location. For example, the user interface 134 may be disposed on one of the spokes 26.

Referring to FIG. 5A, the light-producing assembly 60 is illustrated having five portions 54a, 54b, 54c, 54d, 54e. Each portion 54a, 54b, 54c, 54d, 54e may illuminate individually and in a plurality of colors and intensities, as described herein. Such a configuration may allow the lighting system 10 to be used as a turn signal notification notifying an occupant of a vehicle turn signal position. Accordingly, each portion 54a, 54b, 54c, 54d, 54e may illuminate sequentially to provide a directional notification of the positional status of the vehicle's turn signal. More specifically, portion 54a may illuminate first, followed by portion 54b, portion 54c, portion 54d, and ending with portion 54e. Each previously illuminated portion 54a, 54b, 54c, 54d may maintain its illuminated state while each sequential portion is illuminated. Alternatively, each portion 54a, 54b, 54c, 54d, 54e may return to an unilluminated state when the following portion becomes illuminated. Moreover, the sequential illumination of the lighting system 10 may be continuously repeated until the vehicle turn signal returns to a neutral position. It should be appreciated that the above described example is not limiting and that any desired illumination pattern may be used for a plurality of vehicle-related conditions without departing from the concepts provided herein.

The embodiment illustrated in FIG. 5A may also be utilized in conjunction with an onboard vehicle Global Positioning System (GPS). For example, if a vehicle 14 has a desired location, the GPS may illuminate portions of the light source 52 to notify the driver of a recommended vehicle 14 directional change through the use of any illumination pattern (e.g., sequential illumination of a plurality of portions). It should be appreciated that the light-producing assembly 60 may be utilized for providing any desired notification to the occupant in conjunction with another system within the vehicle 14. For example, the lighting system 10 may also be utilized by vehicle back-up assist or trailer back-up assist system for notifying the occupants of a recommended rotational change of the steering wheel 16. Moreover, a plurality of portions (e.g., 54a, 54b, 54c, 54d, 54e (FIG. 5A)) may partially or fully surround the circumference of the rim 24, and may represent a recommended magnitude of rotation to the occupant based on the number or portions and/or intensity of illuminated portions around the rim 24. More specifically, if a driver should rotate the steering wheel 16 ninety degrees clockwise, a quarter of the rim 24 may illuminate thereby representing the amount of rotation. Further, each portion may become unilluminated as the steering wheel 16 rotates thereby representing the decreasing amount of rotation necessary to accumulate to the original desired angle. It is also contemplated that a symbol 56 (e.g., arrows) may be disposed on any steering wheel 16 component and may contain a photoluminescent material 96 or be backlit by the light-producing assembly 60 such that additional information may be conferred to the occupant of the vehicle 14.

Referring to FIG. 5B, the lighting system 10 is illustrated as a fuel meter 140 that correlates to the proportion of fuel disposed in a fuel tank of the vehicle 14. As the amount of fuel in the vehicle 14 is depleted, the portions 58a, 58b, 58c, 58d, 58e of the light source 52 may become unilluminated.

In some embodiments, the light-producing assembly 60 may also illuminate some or all portions thereof when the vehicle 14 senses an issue with some portion of the vehicle 14. For example, once the fuel is depleted past a pre-defined portion, a portion of the light-producing assembly 60 may flash so that an occupant may recognize an action is necessary. Exemplary issues that may initiate the warning indicator include low tire pressure, low oil pressure, low battery power, and/or any other system malfunction onboard the vehicle 14.

According to an alternate embodiment, the vehicle 14 may be equipped with a heated and/or cooled steering wheel 16, as known in the art. The lighting system 10 may be configured to illuminate in a first color (e.g., blue) when the steering wheel 16 is cooled. Similarly, the steering wheel 16 may be configured to illuminate in a second color (e.g., red) when the steering wheel 16 is heated.

Figure 6:
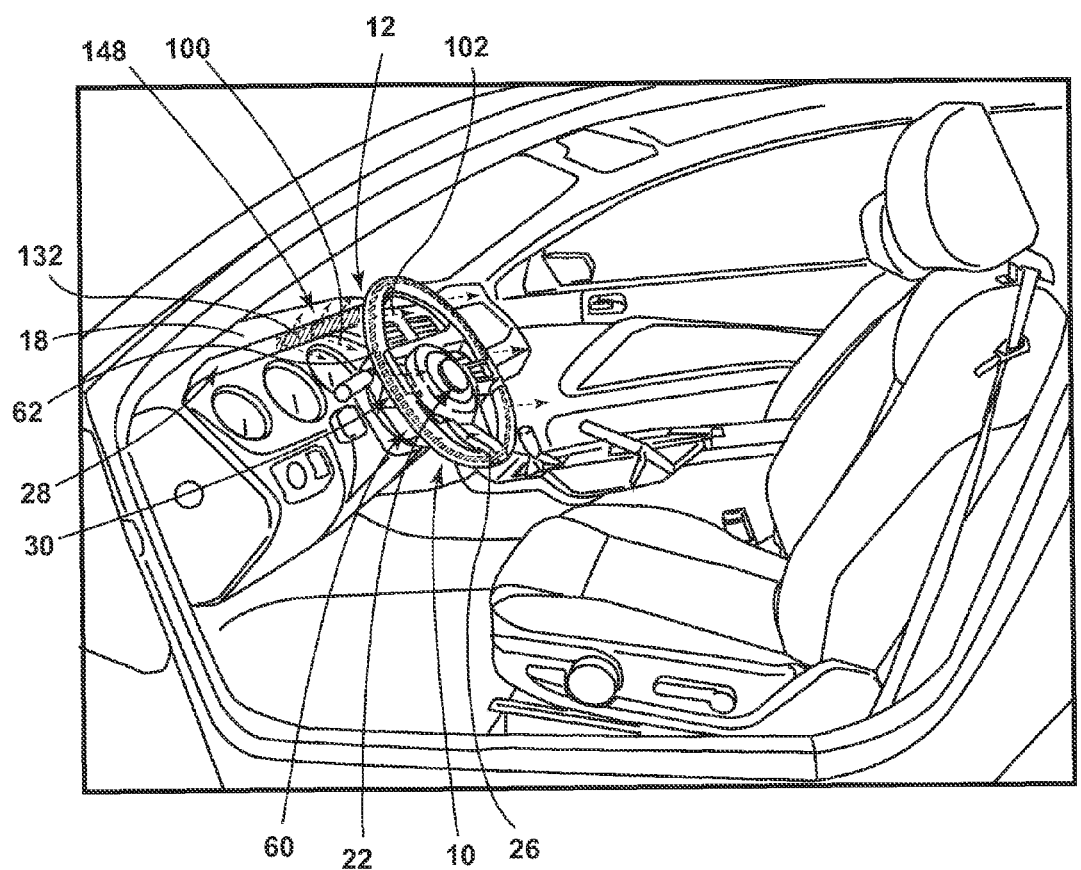
FIG. 6 illustrates an exemplary perspective view of a vehicle interior employing the lighting system and a second luminescent portion on a feature of the vehicle.

Referring to FIG. 6, a first photoluminescent structure 62 is disposed on the light-producing assembly 60 and a second photoluminescent structure 132 is disposed on a feature 148 of the vehicle 14, such a portion of the instrument cluster 28 and/or instrument panel 18. As described above, the portion of the light-producing assembly 60 having the photoluminescent structure 62 thereon converts inputted light 100 to outputted light 102 of a different wavelength. A second portion of the light-producing assembly 60 emits inputted light 100 that is then converted by the second photoluminescent structure 132 on the instrument cluster 28 to an outputted light 102 of a different wavelength. The outputted light 102 may be used as welcome/farewell sequence light, ambient light, to illuminate any interior feature 148 of the vehicle 14, and/or a warning indicator.

Still referring to FIG. 6, two light-producing assemblies 60 may be disposed on two opposing sides of the rim 24 that may be integrally formed as a single component or individually attached to the rim 24. The first light-producing assembly 60 has a photoluminescent structure 62 thereon for emitting converted light towards occupants of the vehicle 14. The second light-producing assembly 60 may be disposed on the car forward portion of the rim 24. A first portion of light emitted from the second light-producing assembly 60 may be converted by a photoluminescent structure 62 thereon thereby providing ambient light and/or backlighting the steering wheel 16. A second portion of light emitted from the second light-producing assembly 60 may directed towards a feature 148 car forward of the steering wheel 16 having a second photoluminescent structure 62 thereon, such as a portion of the instrument cluster 28. The second photoluminescent structure 132 may illuminate in response to inputted light 100 emitted from the second light-producing assembly 60 in response to pre-defined conditions, as described herein. Accordingly, the light source 52 may have a first curvature substantially matching the radius of the rim 24 and a second, transverse curvature substantially matching a cross-sectional shape of the substrate 48 forming the rim 24.

As illustrated in FIG. 6, the light-producing assembly 60 may be attached, coupled, and/or over molded to a top surface of the rim 24. Thus, the light-producing assembly 60 may be flushly mounted to the top surface of the rim 24 thereby partially concealing from the view of occupants in the unilluminated state. According to one embodiment, the lighting system 10 and/or one or more components thereof have a soft conformable encapsulation to both protect the lighting system 10 and to limit flexing of portions of the lighting system 10. Exemplary materials that may be utilized include, but are not limited to, polyvinyl chloride, vulcanized thermoplastic elastomer, and polyester elastomer.

It is contemplated that the use of a second photoluminescent structure 132 proximate the lighting system 10 may be disposed at any desired location and is not limited to the instrument cluster 28. For example, the second photoluminescent structure 132 may be disposed on a headrest and configured to illuminate a portion thereof in low light conditions. Additionally, the second photoluminescent structure 132 may also provide safety benefits, such as notifying an incoming occupant of specific features 148 within the vehicle 14.

Figure 7:
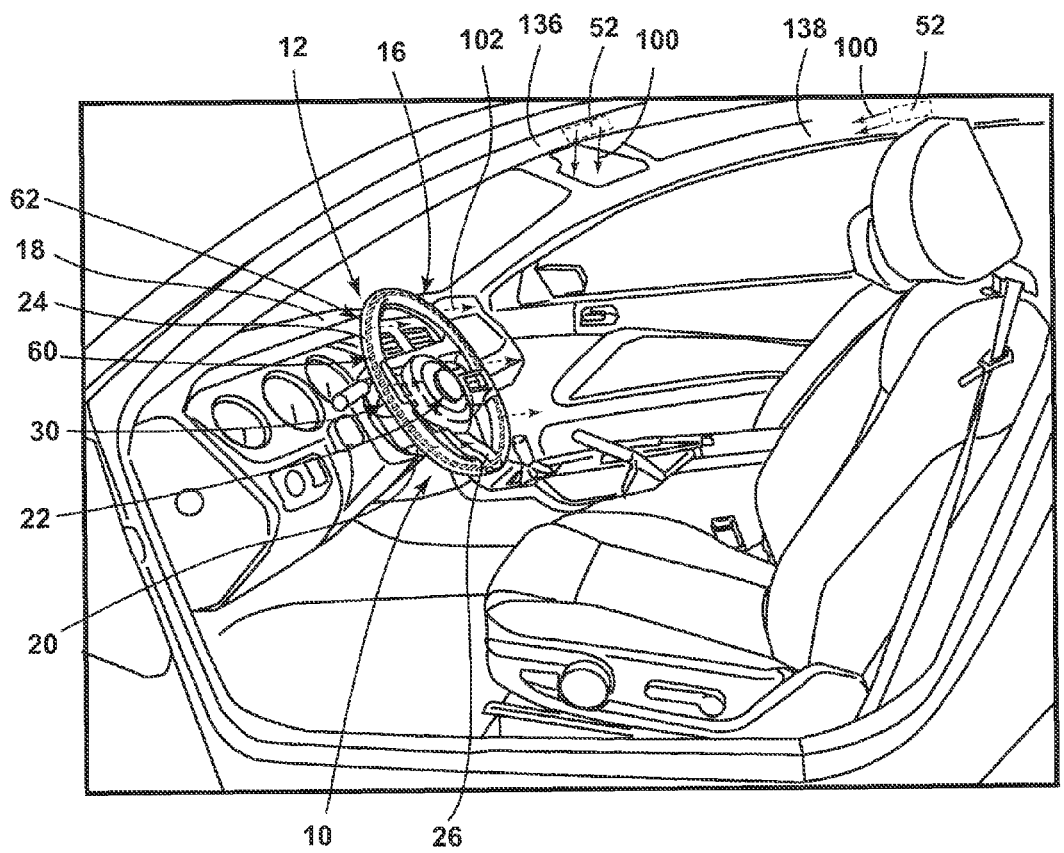
FIG. 7 illustrates an exemplary perspective view of a vehicle interior employing the lighting system with a light source disposed in a component that is separated from the steering wheel, according to another embodiment.

Referring to FIG. 7, an alternate embodiment of the lighting system 10 is illustrated. As illustrated, the photoluminescent structure 62 is disposed on the rim 24 of the steering wheel 16. A light source 52 is separated from and disposed in a portion of the vehicle cabin. For example, the light source 52 may be disposed in an A-pillar 136 of the vehicle 14 or a headliner 138 of the vehicle 14. It should be appreciated, however, that the light source 52 may be disposed in any location such that the light source 52 may be directed towards the steering wheel assembly 12. The inputted light 100 may be of a first wavelength that is configured to excite the photoluminescent structure 62 on the rim 24. In response, the photoluminescent structure 62 may illuminate at a second wavelength of outputted light 102. In some embodiments, a plurality of photoluminescent materials 96 may be disposed on the rim 24 that are configured to illuminate in a wide range of colors such that a single, multi-wavelength light source 52 may be capable of producing illumination of the rim 24 in a plurality of colors.

Figure 8:
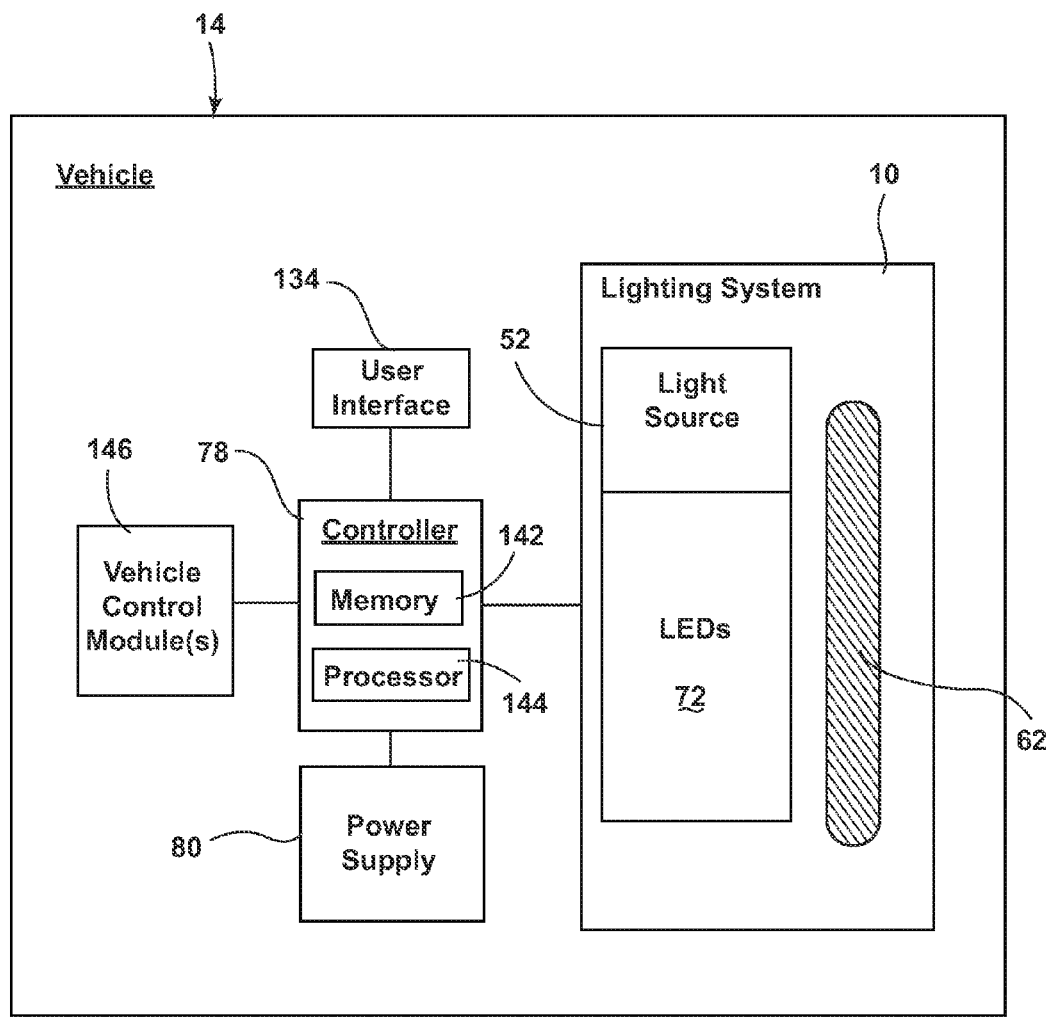
FIG. 8 is a block diagram of the vehicle and the lighting system.

Referring to FIG. 8, a block diagram of a vehicle 14 is generally shown in which the lighting system 10 is implemented. The lighting system 10 includes a controller 78 in communication with the light source 52. The controller 78 may include memory 142 having instructions contained therein that are executed by a processor 144 of the controller 78. The controller 78 may provide electrical power to the light source 52, or to a respective bus bar 82, 84, via a power source 80 located onboard the vehicle 14. In addition, the controller 78 may be configured to control the inputted light 100 emitted from each light source 52 based on feedback received from one or more vehicle control modules 146 such as, but not limited to, a body control module, engine control module, steering control module, brake control module, the like, or a combination thereof. By controlling the inputted light 100 emitted from the light source 52, the lighting system 10 may illuminate in a variety of colors and/or patterns to provide an aesthetic appearance, or may provide vehicle information to an intended observer. For example, when the lighting system 10 is illuminated, the lighting system 10 may notify an occupant of the vehicle 14 about a specific condition of the vehicle 14.

In operation, the photoluminescent structure 62 may exhibit periodic unicolor or multicolor illumination. For example, the controller 78 may prompt the light source 52 to periodically emit only the first wavelength of inputted light 100 via the LED sources 72 to cause the photoluminescent structure 62 to periodically illuminate in the first color. Alternatively, the controller 78 may prompt the light source 52 to periodically emit only the second wavelength of inputted light 100 via LED sources 72 to cause the photoluminescent portion to periodically illuminate in the second color. Alternatively, the controller 78 may prompt the light source 52 to simultaneously and periodically emit the first and second wavelengths of inputted light 100 to cause the photoluminescent structure 62 to periodically illuminate in a third color defined by an additive light mixture of the first and second colors. Alternatively still, the controller 78 may prompt the light source 52 to alternate between periodically emitting the first and second wavelengths of inputted light 100 to cause the photoluminescent structure 62 to periodically illuminate by alternating between the first and second colors. The controller 78 may prompt the light source 52 to periodically emit the first and/or second wavelengths of inputted light 100 at a regular time interval and/or an irregular time interval.

In another embodiment, the lighting system 10 may include a user interface 134. The user interface 134 may be configured such that a user may control the wavelength of inputted light 100 that is emitted by the LED sources 72 and/or the LED sources 72 that are illuminated. Such a configuration may allow a user to control which features 148 (FIG. 6) are illuminated (e.g., ambient light, warning indicator, turn signal, etc.).

With respect to the above examples, the controller 78 may modify the intensity of the emitted first and second wavelengths of inputted light 100 by pulse-width modulation or current control. In some embodiments, the controller 78 may be configured to adjust a color of the emitted light by sending control signals to adjust an intensity or energy output level of the light source 52. For example, if the light source 52 is configured to output the first emission at a low level, substantially all of the first emission may be converted to the second emission. In this configuration, a color of light corresponding to the second emission may correspond to the color of the emitted light from the lighting system 10. If the light source 52 is configured to output the first emission at a high level, only a portion of the first emission may be converted to the second emission. In this configuration, a color of light corresponding to mixture of the first emission and the second emission may be output as the emitted light. In this way, each of the controllers 78 may control an output color of the emitted light.

Though a low level and a high level of intensity are discussed in reference to the first emission of inputted light 100, it shall be understood that the intensity of the first emission of inputted light 100 may be varied among a variety of intensity levels to adjust a hue of the color corresponding to the emitted light from the lighting system 10. The variance in intensity may be manually altered, or automatically varied by the controller 78 based on predefined conditions. According to one embodiment, a first intensity may be output from the lighting system 10 when a light sensor senses daylight conditions. A second intensity may be output from the lighting system 10 when the light sensor determines the vehicle 14 is operating in a low light environment.

As described herein, the color of the outputted light 102 may be significantly dependent on the particular photoluminescent materials 96 utilized in the photoluminescent structure 62. Additionally, a conversion capacity of the photoluminescent structure 62 may be significantly dependent on a concentration of the photoluminescent material 96 utilized in the photoluminescent structure 62. By adjusting the range of intensities that may be output from the light source 52, the concentration, types, and proportions of the photoluminescent materials 96 in the photoluminescent structure 62 discussed herein may be operable to generate a range of color hues of the emitted light by blending the first emission with the second emission.

Accordingly, a lighting system utilizing a steering wheel assembly has been advantageously provided herein. The steering wheel assembly retains its structural properties while providing luminescent light having both functional and decorative characteristics. In some embodiments, the light source may implement a thin design, thereby helping to fit the light source into small package spaces of the vehicle 14 where traditional light sources may not be practicable.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A lighting system for a vehicle, comprising:
   a light source having a plurality of independently illuminable portions disposed circumferentially around a steering wheel; and
   a first photoluminescent structure disposed on the light source and configured to luminesce in response to excitation by the light source, wherein the light source progressively illuminates adjacent portions to notify a driver of a suggested rotational direction of the steering wheel.

2. The lighting system for a steering wheel assembly of claim 1, wherein the light source comprises a plurality of printed LEDs.

3. The lighting system for a steering wheel assembly of claim 2, wherein the first photoluminescent structure comprises at least one photoluminescent material configured to convert an inputted light received from at least a portion of the light source into a visible light that is outputted to a viewable portion.

4. The lighting system for a steering wheel assembly of claim 3, wherein the inputted light comprises one of blue light, violet light, and UV light.

5. The lighting system for a steering wheel assembly of claim 1, further comprising:
   a second photoluminescent structure separated from the steering wheel.

6. The lighting system for a steering wheel assembly of claim 1, further comprising a controller for controlling an activation state of the light source in response to at least one vehicle-related condition.

7. The lighting system for a steering wheel assembly of claim 1, wherein the light source cooperates with a global positioning system to direct an occupant to change an orientation of the steering wheel.

8. A lighting system, comprising:
   a steering wheel having a central hub and a rim connected to the hub through a spoke;
   a light-producing assembly disposed on the rim and a having a plurality of independently illuminable portions, wherein the independently illuminable portions include varying concentrations of tight sources therein;
   a first luminescent structure disposed on the steering wheel and configured to luminesce in response to excitation by at least a portion of the light-producing assembly.

9. The lighting system of claim 8, wherein the light-producing assembly comprises a printed LED.

10. The lighting system of claim 8, wherein the light-producing assembly is configured to notify an occupant of a recommended rotational magnitude based on a portion of the rim that is illuminated.

11. The lighting system of claim 9, wherein the luminescent structure comprises at least one luminescent material configured to convert an inputted light received from at least a portion of the printed LED into a visible light that is outputted to a viewable portion.

12. The lighting system of claim 8, further comprising:
    a second luminescent structure separated from the rim.

13. The lighting system of claim 12, wherein the first luminescent structure illuminates in a first color and a second luminescent structure illuminates in a second color.

14. The lighting system of claim 8, wherein the light-producing assembly has a first curvature substantially matching a radius of the rim and a second, transverse curvature substantially matching a cross-sectional shape of a substrate forming the rim.

15. A lighting system for a vehicle steering wheel assembly lighting system, comprising:
    a light source disposed on a steering wheel and configured to direct light in two opposing directions away from the steering wheel;
    a first photoluminescent structure disposed on the steering wheel, wherein the first photoluminescent structure is configured to luminesce in response to excitation by light output from the light source; and
    a second photoluminescent structure disposed on a vehicle component separated from the steering wheel assembly.

16. The lighting system for a vehicle steering wheel assembly of claim 15, wherein the light source comprises a plurality of printed LEDs.

17. The lighting system for a vehicle steering wheel assembly of claim 16, wherein the first photoluminescent structure comprises at least one photoluminescent material configured to down convert an inputted light received from at least a portion of the light source into a visible light that is outputted to a viewable portion.

18. The lighting system for a vehicle steering wheel assembly of claim 17, wherein the inputted light comprises one of blue light, violet light, and UV light.

19. The lighting system for a vehicle steering wheel assembly of claim 15, wherein the light source has a first curvature substantially matching a radius of a rim of the steering wheel and a second, transverse curvature substantially matching a cross-sectional shape of a substrate forming the rim of the steering wheel.

20. The lighting system for a vehicle steering wheel assembly of claim 15, wherein the light source is configured to notify an occupant of a recommended rotational magnitude based on a portion of a rim of the steering wheel that is illuminated.

* * * * *